United States Patent [19]
Harris et al.

[11] Patent Number: 5,428,365
[45] Date of Patent: Jun. 27, 1995

[54] METHOD AND APPARATUS FOR GENERATING UNIFORM ILLUMINATION

[75] Inventors: Laura Harris, Eugene; Jeff Olsen, Elmira, both of Oreg.

[73] Assignee: Inwave Corporation, Eugene, Oreg.

[21] Appl. No.: 219,618

[22] Filed: Mar. 29, 1994

Related U.S. Application Data

[63] Continuation-in-part of Ser. No. 211,235, Mar. 25, 1994.

[51] Int. Cl.⁶ .............................................. G09G 3/34
[52] U.S. Cl. ................................. 345/55; 340/815.42; 362/32
[58] Field of Search ...................... 340/815.42, 815.43; 348/804; 362/32, 301; 359/70; 345/55, 84, 87

[56] References Cited

U.S. PATENT DOCUMENTS

| | | |
|---|---|---|
| 3,455,622 | 7/1969 | Cooper . |
| 3,962,702 | 6/1976 | Kriege ............... 340/815.43 |
| 4,755,918 | 7/1988 | Pristash et al. ............ 362/301 |
| 4,777,571 | 10/1988 | Morgan ............... 362/123 |
| 4,780,798 | 10/1988 | Iida ............... 362/32 |
| 4,786,127 | 11/1988 | Molnar . |
| 4,915,479 | 4/1990 | Clarke . |
| 4,950,059 | 8/1990 | Roberts ............... 362/32 |
| 5,289,356 | 2/1994 | Winston ............... 362/217 |
| 5,325,276 | 6/1994 | Sullivan ............... 362/301 |

Primary Examiner—Jeffery Brier
Attorney, Agent, or Firm—Stoel Rives Boley Jones & Grey

[57] ABSTRACT

A reflector assembly (60) for a fiber-optic matrix display system (10) designed to improve the coupling efficiency of luminous energy between a light emitting element (52) and an input matrix (26) and to provide one or more input matrices (26) with substantially uniform illumination over their respective surfaces. The reflector assembly (60) preferably includes an input aperture for receiving luminous energy from the light emitting element (52); a larger output aperture (70) through which the luminous energy exits the reflector assembly (60) to impinge on the imaging medium and the input terminals (28) of the input matrix (26); and a reflector head (64) positioned between the input aperture (68) and the output aperture (70) and having a right rectangular pyramidal, hollow frustum shape preferably designed according to the formula

$$\theta_{RD} = \frac{2\sin^{-1}\sqrt{(n_1^2 - n_2^2)}}{4};$$

where $n_1$ is the refractive index of optical conductor cores 82, $n_2$ is the refractive index of optical conductor claddings 84, and $\theta_{RD}$ is the value of angles 86 and 88 by which the respective planar surfaces 72 and 74 diverge from axis 90.

40 Claims, 4 Drawing Sheets

METHOD AND APPARATUS FOR GENERATING UNIFORM ILLUMINATION

This application is a continuation-in-part of U.S. patent application No. 08/211,235, filed Mar. 25, 1994, which claims priority form, international application No. PCT/US91/07329, filed Sep. 27, 1991.

TECHNICAL FIELD

This invention relates to methods for developing uniform fields of illumination for use in display systems and, in particular, to a low-cost, highly efficient means for generating highly intense and uniform illumination and coupling such luminous energy so that it carries an image into optical fibers while preserving the quality of the image presented on a larger display.

BACKGROUND OF INVENTION

Display systems based on coherent arrays of optical fibers have been developed to replace more cost/performance-limited conventional large display systems. The fiber-optic-based display systems can present static or animated images and are well suited for a variety of applications such as advertising and entertainment. These fiber-optic matrix displays offer significant advantages over other, more conventional displays that use light bulbs, LEDs, CRTs, flip disk type mechanisms, or projection systems. These advantages include, for example, lower weight, greater energy efficiency, superior color fidelity, and lower costs of manufacturing, transportation or delivery, operation, and maintenance.

Fiber-optic displays typically employ a source of illumination and an imaging medium such as film transparencies, motion picture film, or transmissive light-valve devices such as liquid crystal panels to generate source images. Light from the illumination source is directed through the imaging medium to an input matrix that holds input terminals of plural elongate optical conductors. The input terminals are mounted in closely packed rows and columns having relative positioning that corresponds with the relative positioning of spaced-apart rows and columns of output terminals of the optical conductors held in a much larger display matrix. Thus, the light delivered to the input terminals is carried along the optical conductors and delivered to the output terminals to form a display image having a greater size than the source image. One such display system is described in International Publication No. WO 93/06584, published on Apr. 1, 1993.

Large displays are often divided into smaller segments or panel sections to reduce costs by easing manufacturing requirements and by simplifying packaging or transportation. Individually providing each panel section with a light source and an imaging medium creates brighter displays that offer increased contrast and viewing distance. Upon installation, these sections are preferably arranged and fixed adjacent to one another so that seams or voids between the sections are eliminated. The imaging media are arranged in communication with the sections to generate a cohesive image when the individual panel sections are illuminated simultaneously. This technique is referred to as tiling.

One disadvantage of tiling is that non-uniform illumination of the separate input matrices will visually delineate the smaller panel sections and spoil the illusion of a single, large display. In addition, the range of point-to-point brightness variations within each of the panel sections contributes to even more substantial point-to-point brightness variations in the larger composite display. An illumination system of a display system should, therefore, efficiently and uniformly couple the high intensity light or luminous energy provided by the light source through the imaging media into the input matrix. The coupling efficiency is largely a function of the angles by which light rays enter the fiber optics.

First, the internal reflection inherent to the cladded optical conductors imposes a critical acceptance angle on the light entering the input terminals of the optical conductors. Thus, light rays impinging on the input terminal of an optical conductor at angles greater than the critical acceptance angle will not be reflected back into the fiber core by the interface formed by the core and cladding and will not propagate through the optical conductor.

Moreover, conventional illumination systems, which may employ ellipsoid reflectors, typically utilize less than 50% of the full acceptance angle of the optical conductors. Thus, optical losses occur because the collecting optics of conventional illumination systems do not efficiently direct luminous energy emitted from the light source into the fiber-optic input matrix. Furthermore, the optical conductors are not straight in most practical applications, but experience curves and bends through wide angular variations that create additional losses.

By providing illumination through only a portion of the entire acceptance angle of an optical conductor, fewer propagation modes become available to the light energy. This increases the statistical likelihood of losing a light ray traveling through the optical conductor due to geometric imperfections and reduces the amount of light energy ultimately conducted by the optical conductor. These losses, combined with non-uniform illumination patterns created by conventional optics, yield lower display intensities and often result in point-to-point variations in display brightness of greater than 60%.

SUMMARY OF THE INVENTION

An object of the present invention is, therefore, to provide a device for collecting and directing a high percentage of luminous energy produced by a light source and efficiently coupling the luminous energy through an imaging media and into an optical system preferably comprising multiple input ends of optical fibers forming a matrix type array of a visual display system.

Another object of the invention is to provide a very uniform pattern of illumination that extends across the entire surface of an imaging media and the entire surface of a subsequent fiber-optic input matrix.

Yet another object of the invention is to provide a design for such a device that is inexpensive and easy to manufacture.

A low-cost fiber-optic matrix illuminator system of the present invention preferably includes an electrically powered lamp and light collecting/directing reflective elements. The lamp is preferably of a metal halide type or other type of high-intensity discharge (H.I.D.) lamp used for large area commercial illumination. The light collecting/directing reflective elements preferably comprise four or more planar reflective surfaces and, in one embodiment, a cylindrical reflective surface, all constructed and oriented according to a formula that relates the orientation of the reflective surfaces mathematically and geometrically to the geometric optical constraints imposed by the optical fibers illuminated by the system. This reflector construction reduces or eliminates point-to-point visible differences in brightness variation in a display section of the display system. The imaging media are preferably tiled to enable the use of low-cost, readily available light valve panels as the imaging media to generate video imaging.

Several embodiments of the present invention provide for an optimized implementation of the tiling technique to provide the input matrix of each of two or more display sections with very uniform illumination having little or no visible difference in brightness from one point to the next and from one section to the next. This level of uniformity is desirable for creating the illusion of a single, large display rather than several smaller display segments. Additional objects and advantages of the present invention will be apparent from the following detailed description of preferred embodiments thereof, with reference to the accompanying drawings.

DETAILED DESCRIPTION OF PREFERRED EMBODIMENTS

Figure 1:
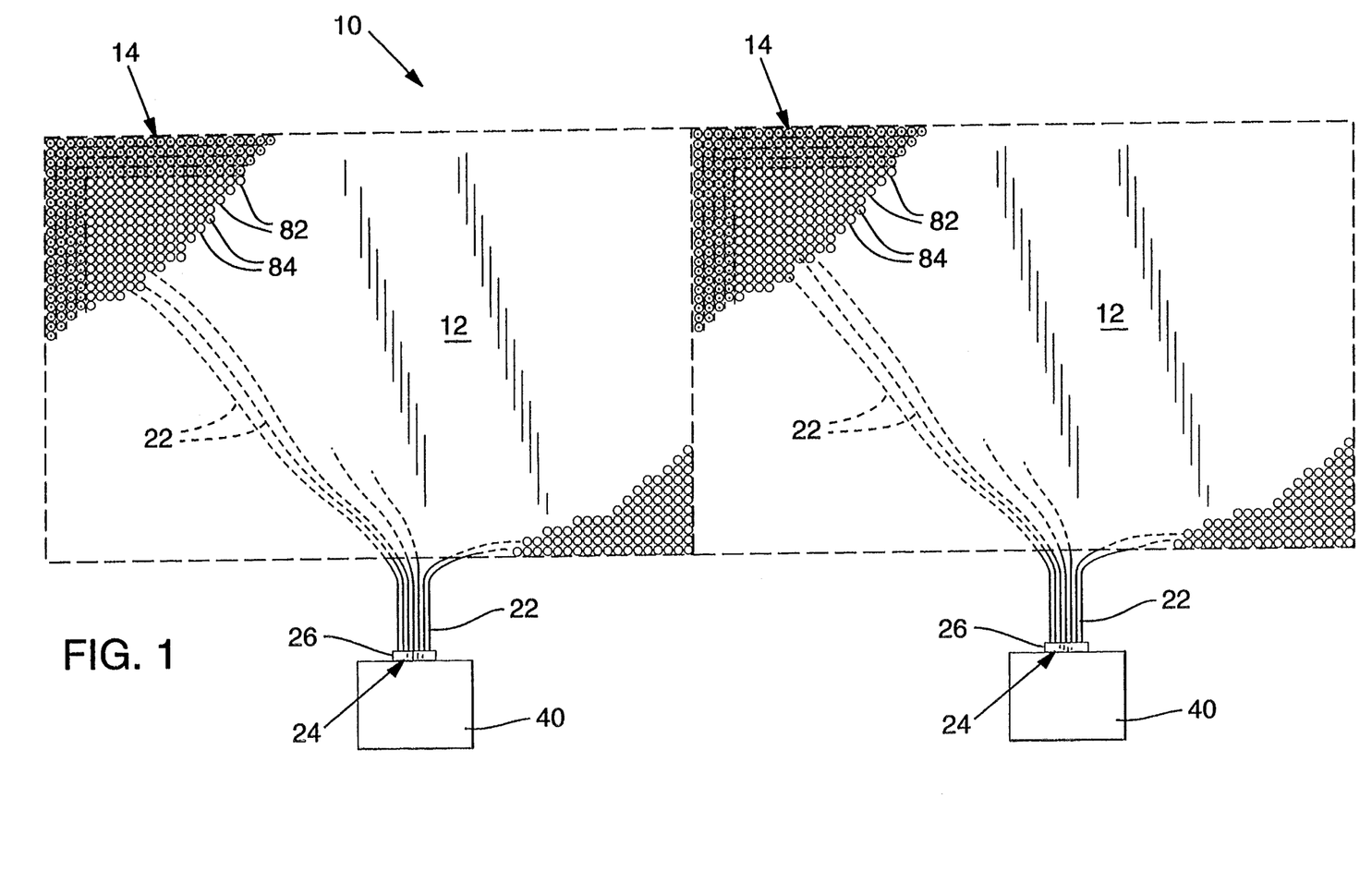
FIG. 1 is a simplified front elevation view of a fiberoptic matrix display system.

With reference to FIG. 1, a conventional fiberoptic matrix display system 10 includes one or more display panel sections 12. Each one of the multiple panel sections covers an area of, for example, 2.5–20 m² and includes a rectangular display matrix 14 of spaced-apart rows 16 and columns 18 of output terminals 20 of optical conductors 22 (of which only a limited number are shown partly in phantom).

Optical conductors 22 preferably comprise long and thin waveguides such as 0.75 and 1.0 mm diameter, polymethyl-methacrylate optical fibers having a fluorinated polymer cladding and exhibiting fairly low losses of around 0.17 dB/m. Optical conductors 22 are collated into a launch grid 24 containing an input matrix 26 of an array of input terminals 28 (FIG. 2B). Optical conductors 22 connect input matrix 26 to display matrix 14 in a prescribed pattern and provide for the transmission of light from input matrix 26 to display matrix 14. Input terminals 28 are separately connected on a one-to-one basis by optical conductors 22 to corresponding output terminals 20. In addition, the relative locations of input terminals 28 in input matrix 26 are geometrically similar to the relative locations of output terminals 20 in display matrix 14.

Figure 2A:
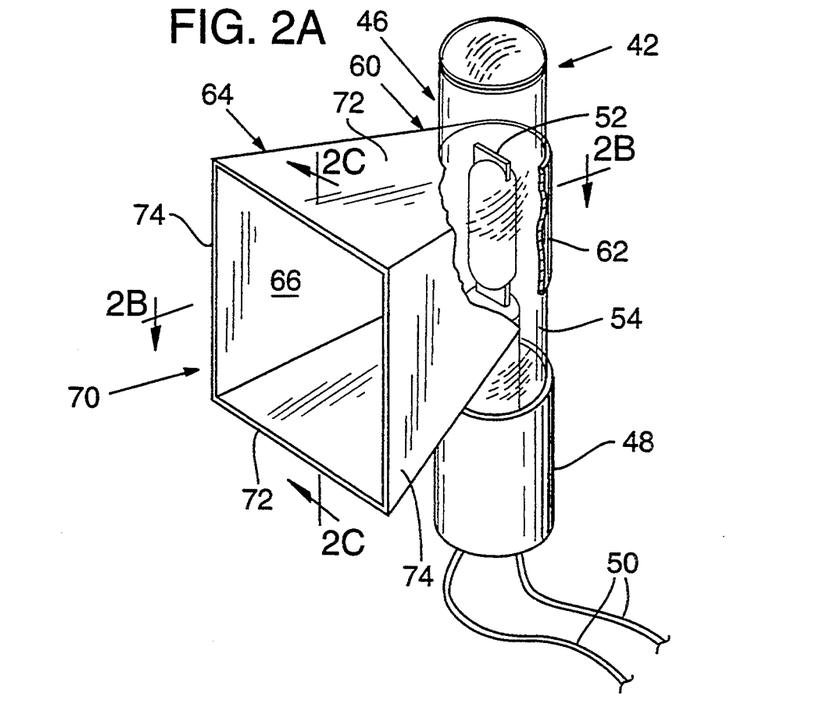
FIG. 2A is an isometric view of a preferred embodiment of an illuminator system of the present invention, with a section cut away to show the light emitting element.
Figure 2B:
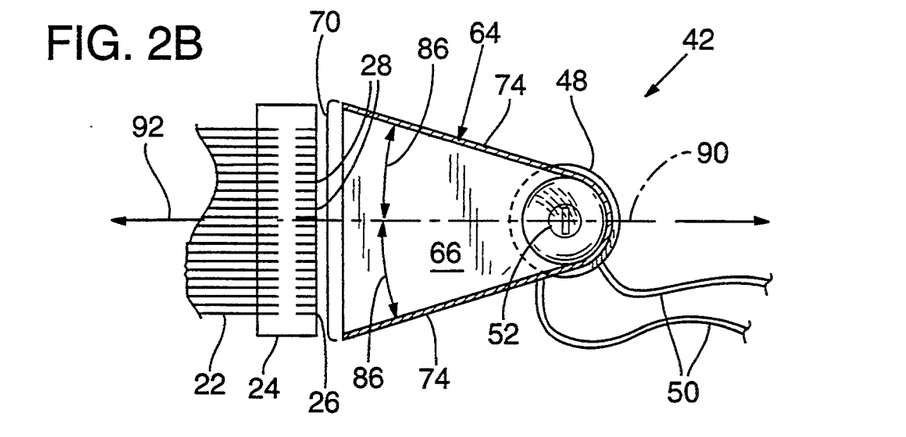
FIGS. 2B and 2C are respective top and side sectional views of a preferred embodiment of the invention showing various geometric axes used to align various elements of the illuminator system shown in FIG. 2A.
Figure 2C:
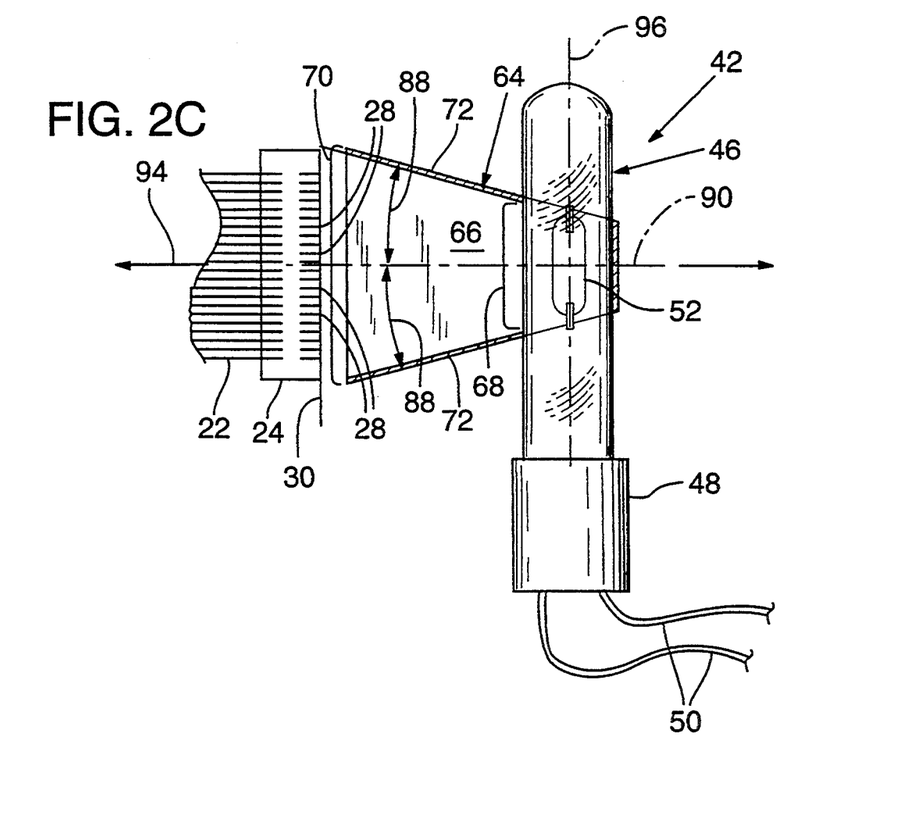

With reference to FIGS. 1 and 2C, the input matrix 26 preferably constitutes a plane 30 and receives an optical source image from a projector 40 employing an illuminator system 42 and an imaging medium (not shown). The imaging medium is positioned between the illuminator system 42 and the input matrix 26, and may include, for example, film transparencies, motion picture film, or transmissive light-valve devices such as liquid crystal displays.

With reference to FIGS. 2A, 2B, and 2C, an illuminator system 42 preferably employs a light source such as a tubular high intensity discharge (HID) type lamp 46 held by lamp socket 48 and supplied with electrical energy through lead wires 50. A HID lamp is preferred because it efficiently converts electricity into light and has a relatively long life. Such a lamp 46 preferably has a light emitting element 52 comprising an electric arc-containing tube positioned centrally within lamp envelope 54. A lamp 46 of a tubular type permits reflective surfaces 66 of partial cylindrical section 62, planar surface sections 72, and planar surface sections 74 to be positioned closer to light emitting element 52 within lamp 46 to allow the construction of smaller reflector assemblies 60. In an incandescent type lamp, element 52 would be replaced with a lamp filament.

Illuminator system 42 also employs a reflector assembly 60 having a partial cylindrical section 62 positioned around lamp envelope 54 and a reflector head 64 extending from lamp envelope 54 and having inner reflective surfaces 66. Reflector assembly 60 is positioned about element 52 and lamp 46 to optimize the amount of uniform intensity light entering input aperture 68 and exiting output aperture 70 to reach input terminals 28 of input matrix 26. Partial cylindrical section 62 also redirects light back through lamp 46 toward input matrix 26 and inner reflective surfaces 66. Reflector head 64 preferably includes two pairs of symmetrical planar surface sections 72 and 74 arranged in a right rectangular pyramidal, hollow frustum shape designed according to the following divergence formula:

$$\theta_{RD} = \frac{2\sin^{-1}\sqrt{(n_1^2 - n_2^2)}}{4};$$

where $n_1$ is the refractive index of cores 82 (FIG. 1) of optical conductors 22; $n_2$ is the refractive index of claddings 84 (FIG. 1) of optical conductors 22; $\theta_{RD}$ is the value of angles 86 and 88 by which the respective planar surfaces 72 and 74 diverge from axis 90. Axis 90 may be defined by planes 92 and 94 that bisect planar surfaces 72 and 74, respectively.

Plane 92 is preferably vertical and bisects input matrix 26 and light emitting element 52. Plane 94 is preferably horizontal, i.e., perpendicular to plane 92, and bisects input matrix 26 and light emitting element 52. Planes 92 and 94 are preferably both perpendicular to plane 30 and plane 96, which vertically bisects light source 46 and light emitting element 52.

The design of reflector head 64 provides a uniform pattern of illumination at the plane 30 of input matrix 26 and directs luminous energy from light emitting element 52 to impinge upon the input terminals 28 of optical conductors 22 at angles substantially equivalent to the geometric optical requirements imposed by the refractive nature of the optical conductors, thus achieving a high coupling efficiency. Planar surfaces 72 and 74 are preferably within plus or minus 15% of the $\Omega_{RD}$ value to provide the best results.

Light emitting element 52 of lamp 46 is preferably positioned centrally with respect to planar reflective surfaces 72 and 74. However, positioning is not critical. An off-center deviation of about 20% of the length of the light emitting element in either direction will have a negligible effect on performance of display system 10. The position error tolerance provided by this invention permits less precise assembly procedures to manufacture reflector assemblies 60 that provide consistent uniform illumination, thereby lowering manufacturing costs. The position insensitivity intrinsic in this design results from counter-reflections produced by the arrangement of planar surfaces 72 and 74 that balance automatically any radiation asymmetry of lamp 46 or position error. As the light energy reflected from one surface diminishes whenever the light emitting element 52 or lamp 46 moves away from it, the light energy reflected from the opposing reflective surface increases proportionally. The geometry of the reflective surfaces and their orientation to each other allow multiple reflections to take place inside reflector assembly 60 so as to uniquely contribute to the illumination field in a way that negates the effects of minor variances in lamp position. Similarly, this same geometry negates any detrimental effects caused by arc wandering instabilities sometimes seen in HID lamps 46.

Reflective surfaces 66 of partial cylindrical section 62 and symmetrical planar surface sections 72 and 74 may be made from various reflective materials and by various processes. The simple forming of polished sheet aluminum into sections 62, 72, and 74 provides the greatest economy and is adequate for certain applications employing high transmitting imaging media such as film. This material is readily available as sheets with a thickness of 0.5 mm to 0.8 mm and sold under the trade names Coilzak and Everbrite. Common sheet metal forming tools and techniques yield good results.

However, for applications employing low transmittance or extremely heat-sensitive imaging media, such as liquid crystal video devices, more sophisticated glass-coated or electroformed metal surfaces are desirable. The preferred electroforming process yields a reflector head 64 having a surface geometry accurate to about plus or minus two arc minutes and yields about 25% greater output than the polished aluminum sheets. The process employs a stainless steel master tool, highly polished to the final reflector surface quality, that is duplicated down to a molecular level by immersion in a nickel sulfate solution. The tool is connected as the anode to a low-voltage, high-current power supply. The cathode is made from solid nickel metal and immersed with the tool in the nickel sulfate solution. Upon application of electrical current, nickel metal is electrolytically deposited on the tool until the material is about 0.7 mm to 1.3 mm thick. The resulting reflector sections 72 and 74 are removed from the tool and are subjected to post-forming processes such as the removal of "flashing" or other excess material from the edges.

A chromatically desirable surface material (nickel tends to be slightly yellow) such as rhodium or aluminum may then be vacuum deposited onto sections 72 and 74. Additional optical coatings may also be applied, such as a dichroic "cold" coating. The dichroic coating is a multilayer dielectric coating that exploits interference phenomena to absorb infrared energy and to efficiently reflect visible light. Such a coating allows the illuminator system 42 to provide intense light having very little heat. Persons skilled in the art will appreciate that placing a thin Pyrex "hot" glass mirror, having similar dielectric thin film coatings to reflect infrared while passing visible light, in front of reflector head 64 may alternatively be employed to reduce the heat content of the light. Such a mirror would reflect the infrared energy back into reflector head 64 but pass the visible light onto the imaging media.

An aluminum sheet prototype of the embodiment depicted in FIGS. 2A, 2B, and 2C was adapted for use with an input matrix 26 employing an Iwasaki MT-250 DL, 250 watt metal halide tubular lamp with a 3.08 cm diameter and Mitsubishi Eska, type SK-40, 1 mm diameter, polymethylmethacrylate, step index optical fibers. These fibers have a core refractive index of $n_1 = 1.495$ and a cladding refractive index of $n_2 = 1.402$.

Solving the divergence formula for these values yielded a $\Theta_{RD}$ of 15.63°. In the prototype the values of angles 86 and 88 were rounded for convenience to 15°, which is well within the 15% tolerance of reflector assembly 60. Output aperture 70 was 12.7 cm wide by 17.78 cm high. The resulting prototype provided a uniform field of illumination where any two points on display matrix 14 varied by less than 5% in brightness. When a conventional ellipsoid type reflector was substituted for the prototype reflector assembly 60, the brightness between points (typically center to corner) varied by greater than 40%, and often greater than 60% because of the focussing nature of ellipsoid reflectors. The prototype dissipated about 82% of the heat generated by light emitting element 52.

Figure 3:
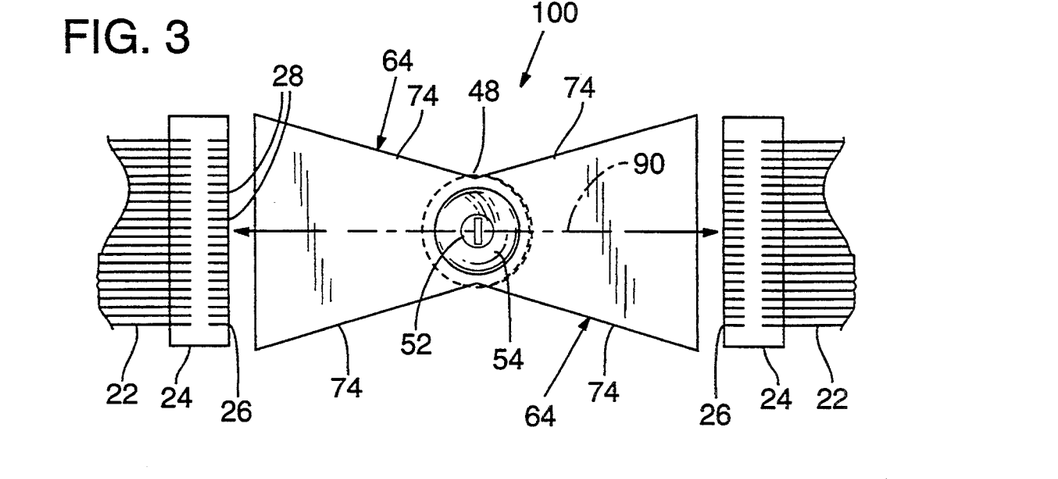
FIG. 3 is a plan view of an alternative embodiment of a reflector assembly having two reflector heads.

FIG. 3 shows an alternative embodiment of a reflector assembly 100 having two reflector heads 64 positioned back to back along a common axis 90. In this embodiment, partial cylindrical section 62 may be omitted or split into two separate sections and substantially reduced in size. Planar surface sections 72 and 74 of both reflector heads 64 are positioned according to the formula given above. This embodiment enables two input matrices 26 to receive uniform illumination of the same intensity to provide a display system 10 having two side-by-side panel sections 12 with a composite display image of uniform intensity. Alternatively, reflector heads 64 may be positioned at different angles with respect to their independent axes 90 and may provide uniform illumination to a two-sided display system 10 where it is desirable to have displayed information both on the front and bank of a sign board to see audience viewing from two opposing directions.

Figure 4:
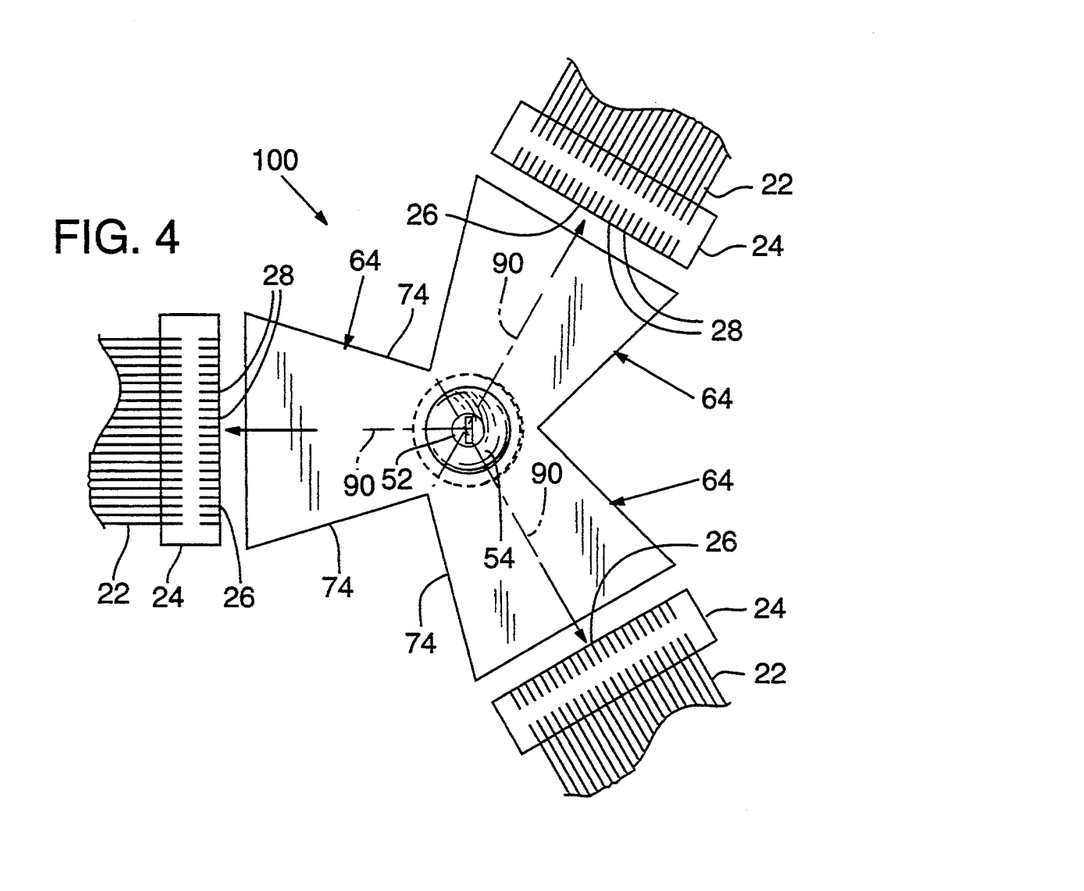
FIG. 4 is a plan view of an alternative embodiment of a reflector assembly having three reflector heads.

FIG. 4 shows an alternative embodiment or reflector assembly 110 having three reflector heads 64 positioned so that their respective axes 90 intersect at 120° angles. This embodiment may be used to provide three input matrices 26 with uniform illumination, thus enabling uniform output for three side-by-side panel sections. A display system 10 incorporating this embodiment may also find utility in locations where, for instance, two concourses intersect or in lobbies where the viewing audience would have occasion to view the display simultaneously from many angles.

It will be appreciated by those skilled in the art that other manifestations of the invention may incorporate more than three reflector heads 64 to illuminate more than three input matrices 26 from a single lamp 46 so long as the planar surfaces sections 72 and 74 of the reflector heads 64 comply with the formula previously presented.

Figure 5:
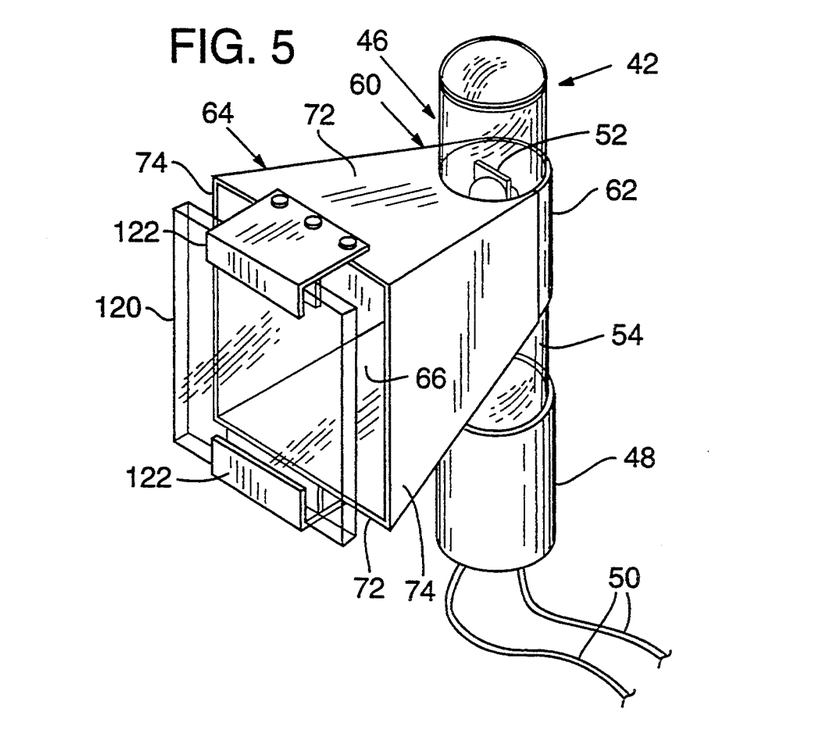
FIG. 5 is an isometric view of the embodiment shown in FIG. 1 incorporating a heat-absorbing filter.

FIG. 5 shows an embodiment of reflector assembly 60 incorporating a piece of heat absorbing glass 120 held in place by brackets 122 connected to the reflector assembly 60. Heat control could also be facilitated by the fabrication of the reflective surfaces 66 from glass having thin film type coatings that reflect visible light rays but pass infrared rays. Certain coatings for electroformed reflector assemblies 60, 100, or 110 can also inhibit the transmission of infrared rays toward the imaging medium and input matrix 26 of a display system 10.

It will be obvious to those having skill in the art that various changes may be made in the details of the above-described embodiments of the present invention without departing from the underlying principles thereof. The scope of the present invention should be determined, therefore, only by the following claims.

What is claimed is:

1. A method for providing substantially uniform intensity light across an imaging medium positioned between a light source and an input matrix of closely-packed input terminals of plural elongate optical conductors having a core and a cladding with distinct refractive indices, comprising:

generating relatively high-intensity light from the light source;

directing light through a reflector head positioned between the light source and the imaging medium, the reflector head having at least one pair of reflective surface sections that diverge with about 15% of an angle $\theta_{RD}$ from an axis that bisects the reflector head, where $$\theta_{RD} = \frac{2\sin^{-1}\sqrt{(n_1^2 - n_2^2)}}{4};$$

where $n_1$ is the refractive index of the core of the optical conductors and $n_2$ is the refractive index of the cladding of the optical conductors; and reflecting the light off the reflective surface sections toward the imaging medium and onto the input matrix.

2. The method of claim 1 in which the shape of the reflector head is of a design that negates non uniform illumination effects caused by arc wandering.

3. The method of claim 1 further comprising one or more additional reflector heads and an equal number of imaging media such that all of the imaging media receive light having substantially the same intensities.

4. The method of claim 1 further comprising a partial cylindrical section having an inner reflective surface adapted to be positioned about a light source.

5. The method of claim 1 further comprising:

projecting a source image from the imaging medium uniformly onto the input matrix where each of the plural elongate optical conductors has at its opposite end an output terminal to define a display matrix of spaced-apart output terminals whose relative positioning within a display matrix correspond with relative positioning of the input terminals in the input matrix, such that the display matrix presents an enlarged image having substantially uniform intensity.

6. A reflector assembly, comprising:

an input aperture for receiving light;

an output aperture through which the light exits the reflector assembly, the output aperture being larger than the input aperture;

a reflector head having at least one pair of reflective surface sections positioned between the input aperture and the output aperture to reflect light toward an imaging medium positioned between the output aperture and an input matrix of closely-packed input terminals of plural elongate optical conductors having a core and a cladding with distinct refractive indices; and a bisecting axis that bisects the reflector head such that the surface sections diverge from the axis within the 15% of an angle $\theta_{RD}$, where $$\theta_{RD} = \frac{2\sin^{-1}\sqrt{(n_1^2 - n_2^2)}}{4};$$

where $N_1$ is the refractive index of the core of the optical conductors and $n_2$ is the refractive index of the cladding of the optical conductors.

7. The reflector assembly of claim 6 in which the shape of the reflector head negates non uniform illumination effects of arc wandering.

8. The reflector assembly of claim 6 further comprising one or more additional reflector heads such that all of the output apertures of the reflector heads receive light having uniform and substantially equal intensity.

9. The reflector assembly of claim 6 further comprising a semicylindrical section having an inner 10. In a display system including a light source for providing relatively high-intensity light; an array of plural elongate optical conductors having a core and a cladding with distinct refractive indices, each of the optical conductors also including at opposite ends thereof an input terminal and an output terminal to define respectively an input matrix of closely packed input terminals and a display matrix of spaced-apart output terminals whose relative positioning within the display matrix corresponds with relative positioning of the input terminals in the input matrix; and an imaging medium positioned adjacent to the input matrix to provide the light with an image prior to impinging the input matrix, the improvement comprising:

a reflector assembly including:

an input aperture for receiving the light from the light source;

an output aperture through which the light exits the reflector assembly to impinge on the imaging medium and is transferred to the input terminals of the input matrix, the output aperture being larger than the input aperture;

a reflector head having at least one pair of reflective surface sections positioned between the input aperture and the output aperture to direct reflected light toward the imaging medium; and a bisecting axis that bisects the reflector head such that the surface sections diverge from the axis within about 15% of an angle $\theta_{RD}$, where $$\theta_{RD} = \frac{2\sin^{-1}\sqrt{(n_1^2 - n_2^2)}}{4};$$

where $n_1$ is the refractive index of the core of the optical conductors and $n_2$ is the refractive index of the cladding of the optical conductors.

11. The improvement of claim 10 in which the shape of the reflector head negates non uniform illumination effects of arc wandering.

12. The improvement of claim 10 further comprising one or more additional reflector heads such that all of the output apertures of the reflector heads receive light having substantially uniform and equal intensity.

13. The improvement of claim 10 further comprising a partial cylindrical section having an inner reflective surface adapted to be positioned about a light source and in contact with the reflector head at the input aperture.

14. The improvement of claim 10 in which the display matrix presents an enlarged image having substantially inform intensity.

15. The improvement of claim 10 in which the display matrix presents light having intensity variations between any two output terminals of less than 40%.

16. The improvement of claim 15 in which the display matrix presents light having intensity variations between any two output terminals of less than 5%.

17. The method of claim 1 in which the input matrix receives light having intensity variations between any two input terminals of less than 40%.

18. The method of claim 17 in which the input matrix receives light having intensity variations between any two input terminals of less than 5%.

19. The reflector assembly of claim 6 in which the input matrix receives light having intensity variations between any two input terminals of less than 40%.

20. The reflector assembly of claim 19 in which the input matrix receives light having intensity variations between any two input terminals of less than 5%.

21. The improvement of claim 10 in which the surface sections diverge from the axis at about angle $\Theta_{RD}$.

22. The method of claim 1 in which the surface sections diverge from the axis at about angle $\Theta_{RD}$.

23. The reflector assembly of claim 6 in which the surface sections diverge from the axis at about angle $\Theta_{RD}$.

24. The improvement of claim 10 in which the input terminals of the optical conductors have a critical light acceptance angle and the light impinges on the input terminals at angles that subtend greater than 50% of the critical acceptance angle.

25. The improvement of claim 24 in which the light impinges on the input terminals at angles that subtend substantially the entire critical acceptance angle.

26. The method of claim 1 in which the input terminals of the optical conductors have a critical light acceptance angle and the light impinges on the input terminals at angles that subtend greater than 50% of the critical acceptance angle.

27. The method of claim 26 in which the light impinges on the input terminals at angles that subtend substantially the entire critical acceptance angle.

28. The reflector assembly of claim 6 in which the input terminals of the optical conductors have a critical light acceptance angle and the light impinges on the input terminals at angles that subtend greater than 50% of the critical acceptance angle.

29. The reflector assembly of claim 28 in which the light impinges on the input terminals at angles that subtend substantially the entire critical acceptance angle.

30. The improvement of claim 18 in which the imaging medium is a liquid crystal video device.

31. The method of claim 1 in which the imaging medium is a liquid crystal video device.

32. The reflector assembly of claim 6 in which the imaging medium is a liquid crystal video device.

33. The reflector assembly of claim 6 in which the light is generated from a high intensity light source.

34. The improvement of claim 10 in which the reflector head comprises two pairs of opposing planar reflective surface sections positioned between the input aperture and the output aperture such that each pair symmetrically diverges from a different one of two perpendicular axes within about 15% of angle $\Theta_{RD}$.

35. The method of claim 1 in which the reflector head comprises two pairs of opposing planar reflective surface sections positioned between the input aperture and the output aperture such that each pair symmetrically diverges from a different one of two perpendicular axes within about 15% of angle $\Theta_{RD}$.

36. The reflector assembly of claim 6 in which the reflector head comprises two pairs of opposing planar reflective surface sections positioned between the input aperture and the output aperture such that each pair symmetrically diverges from a different one of two perpendicular axes within about 15% of angle $\Theta_{RD}$.

37. The improvement of claim 10 in which the reflector head has right rectangular pyramidal, hollow frustum shape that causes the light to have uniform intensity across the imaging medium.

38. The method of claim 1 in which the reflector head has right rectangular pyramidal, hollow frustum shape that causes the light to have uniform intensity across the imaging medium.

39. The reflector assembly of claim 6 in which the reflector head has right rectangular pyramidal, hollow frustum shape that causes the light to have uniform intensity across the imaging medium.

40. A method for providing substantially uniform intensity light across an imaging medium positioned between a light source and an input matrix of closely-packed input terminals of plural elongate optical conductors having a core and a cladding with distinct refractive indices that determine the acceptance angle of the input terminals, comprising:
generating relatively high-intensity light from the light source;
directing light through a reflector head positioned between the light source and the imaging medium, the reflector head having at least one pair of reflective surface sections positioned to direct the light toward the imaging medium so that the light impinges upon the input terminals at angles that utilize substantially the full acceptance angle of the input terminals.

* * * * *

UNITED STATES PATENT AND TRADEMARK OFFICE
CERTIFICATE OF CORRECTION

PATENT NO. : 5,428,365
DATED : June 27, 1995
INVENTOR(S) : Laura Harris and Jeff Olsen It is certified that error appears in the above-indentified patent and that said Letters Patent is hereby corrected as shown below:

Column 1, line 7, change "form," to --from--.

Column 5, line 1, change "$\Omega_{RD}$" to --$\theta_{RD}$--.

Column 6, line 14, change "SK-40" to --SK-40--.

Column 6, line 17, change "1.402" to --1.402--.

Column 6, line 19, change "15.63" to --15.63--.

Column 6, line 49, change "bank" to --back--.

Column 6, line 49, change "see" to --serve--.

Column 7, line 31 of Claim 1, change "with" to --within--.

Column 7, line 62 of Claim 5, change "correspond" to --corresponds--.

UNITED STATES PATENT AND TRADEMARK OFFICE
CERTIFICATE OF CORRECTION

PATENT NO. : 5,428,365
DATED : June 27, 1995
INVENTOR(S) : Laura Harris and Jeff Olsen It is certified that error appears in the above-indentified patent and that said Letters Patent is hereby corrected as shown below:

Column 8, line 14 of Claim 6, change "the" to --about--.
Column 8, line 20 of Claim 6, change "$N_1$" to --$n_1$--.
Column 8, line 31 of Claim 9, after "inner" insert --reflective surface adapted to be positioned about a light source and in contact with the reflector head at the input aperture.--
Column 10, line 6 of Claim 30, change "18" to --10--.

Signed and Sealed this

Twenty-sixth Day of December, 1995

*Attest:*

BRUCE LEHMAN

*Attesting Officer*    *Commissioner of Patents and Trademarks*